United States Patent [19]

Blocker

[11] Patent Number: 4,702,754
[45] Date of Patent: Oct. 27, 1987

[54] VAPOR DELIVERY PRESSURE TEST ADAPTER

[76] Inventor: William C. Blocker, 1406 N. Butler Ave., Indianapolis, Ind. 46219

[21] Appl. No.: 848,232

[22] Filed: Apr. 4, 1986

[51] Int. Cl.⁴ .......................................... B01D 46/00
[52] U.S. Cl. ....................................... 55/274; 55/518; 55/504; 55/521; 55/529; 137/223; 137/232; 137/227
[58] Field of Search ............... 55/270, 274, 417, 420, 55/418, 521, 525, 529, 504; 73/756; 137/223, 232, 227, 550; 285/156, 219; 210/446, 454

[56] References Cited

U.S. PATENT DOCUMENTS

| | | | |
|---|---|---|---|
| 548,302 | 10/1895 | Dwyer | 285/156 |
| 988,917 | 4/1911 | Walker | 73/756 |
| 1,927,465 | 9/1933 | McIntosh | 55/270 |
| 2,384,057 | 9/1945 | Wetherell | 55/521 |
| 2,694,022 | 11/1954 | Schreiner | 285/156 |
| 2,876,733 | 3/1959 | Vanderpol et al. | 137/550 |
| 3,357,162 | 12/1967 | Doig | 55/274 |
| 3,458,050 | 7/1969 | Cooper | 55/521 |
| 3,762,564 | 10/1973 | Weedon et al. | 210/446 |
| 3,794,180 | 2/1974 | Blocker | 210/445 |

Primary Examiner—Bernard Nozick
Attorney, Agent, or Firm—Woodard, Emhardt, Naughton Moriarty & McNett

[57] ABSTRACT

A vapor delivery pressure test adapter for integral installation at the outlet of a vapor delivery pressure regulator within a self-contained vapor delivery system, comprising a vapor pipe nipple compatible with such system, with vapor filter means internally and fixedly mounted within the nipple, and delivery pressure test adapter means externally and piercingly mounted to the nipple to permit intermittent external measurement of vapor delivery pressure within the system.

20 Claims, 6 Drawing Figures

VAPOR DELIVERY PRESSURE TEST ADAPTER

BACKGROUND OF THE INVENTION

1. Field of the Invention:

This invention is in the field of self-contained vapor delivery systems, and more specifically, delivery pressure test adapters for such systems.

2. Description of the Prior Art:

There are approximately 5½ million self-contained propane or natural gas delivery systems in the United States being utilized as the primary source of combustion heat in furnaces, stoves, water heaters, etc. A typical prior art furnace system is depicted in FIG. 6. Vapor at a high pressure is supplied from a free-standing supply tank 80. Vapor exits the supply tank 80 through the tank's shut-off valve 82, and into vapor pipe 84, which directs the vapor into a high pressure regulator 86. Vapor typically enters the high pressure regulator 86 at 50 pounds per square inch pressure and typically exits the high pressure regulator to vapor pipe 84 at the regulated pressure of 10 pounds per square inch. Vapor next enters a second stage regulator 88 at the regulated pressure of 10 pounds per square inch and typically exits the second stage regulator 88 to vapor pipe 84 at the regulated pressure of 11 inches on a water column. From the second stage regulator 88, vapor passes through a gas stop-cock shut-off valve 90, through an optional sediment trap 100, and into a gas control, or thermostat, 92. From the gas control 92, vapor exits, still at a pressure of 11 inches on a water column, through vapor pipe 84 to a burner orifice 96 equipped with a pilot light within furnace 94.

Located on the typical gas control or thermostat 92 is a pressure tap 98 that provides direct access to the vapor under pressure within the gas control 92. Utilizing pressure tap 98, a vapor measuring device can verify the delivery pressure at which vapor is being supplied to the burner orifice 96. If a problem develops at the burner orifice 96 that is believed to be attributable to improper performance of either or both of the pressure regulators, 86 or 88, delivery pressure within the system can only be conveniently measured, using the following procedure, at the pressure tap 98 on the gas control 92. First, the pilot at the burner orifice 96 must be turned off. Second, a plug on the pressure tap 98 must be removed and replaced with an appropriate vapor pressure measuring device. Vapor pressure within the gas control 92 can then be directly read on the meter.

However, a reading of vapor pressure at the pressure tap 98 will only measure the output performance of the second stage regulator 88. Taking only the measure of vapor pressure within the gas control 92 will not confirm the vapor pressure exiting the high pressure regulator 86. Thus, if the measure of vapor pressure at pressure tap 98 is too high or too low, such reading will not determine which of the two pressure regulators, 86 or 88, may be maladjusted or malfunctioning. A maladjusted or malfunctioning high pressure regulator could result in improper performance of a properly adjusted and properly functioning second stage regulator. To make the necessary diagnosis under such circumstances, the prior art system of FIG. 6 must be disconnected at the exit of the high pressure regulator 86 to permit measurement of the vapor pressure exiting the high pressure regulator 86, then reconnected at that point to permit a similar measurement of the vapor pressure exiting the second stage regulator 88, after the high pressure regulator has been adjusted or repaired as necessary. Following reconnection of the entire system, the system must be bled to purge the system of air, and the pilot must be relit. Of course, this testing, adjustment, and repair procedure is only accomplished at great expense to the system owner, as it is very labor intensive.

Disclosed herein is a vapor delivery pressure test adapter to be integrally connected to vapor piping 84 at the exit, or outlet, of each pressure regulator within such prior art systems (FIG. 6). The test adapter disclosed provides immediate, direct testing access to the vapor pressure within the vapor pipe 84 at the points of test adapter connection to the system, thereby providing the means to obtain immediate confirmation of the performance levels of the regulators within the system, all without system disassembly or shut-down. The test adapter disclosed allows confirmation in minutes if the high and second stage regulators of such prior art systems (FIG. 6) are performing properly, and insures precise system-operating regulator adjustments.

An often observed problem necessitating system service in such prior art systems (FIG. 6) is the clogging of the gas control 92 and burner orifice 96 with vapor pipe scale flukes and oily by-products. The vapor delivery pressure test adapter as disclosed is provided in one embodiment with a filter device to filter pipe scale flukes and oily by products within such vapor systems, thus protecting the gas control 92 and burner orifice 96 from the source of many service calls.

SUMMARY OF THE INVENTION

One embodiment of the present invention is a vapor delivery pressure test adapter for installation at the outlet of a vapor delivery pressure regulator within a self-contained vapor delivery system, comprising a nipple that is compatible with the system, including a vapor pipe with a first end and a second end, and external screw threads at the first and second ends, and delivery pressure test adapter means externally and piercingly mounted to the pipe between the first end and the second end to permit intermittent external measurement of vapor delivery pressure within the pipe.

Another embodiment of the present invention is a vapor delivery pressure test adapter for installation at the outlet of a vapor delivery pressure regulator within a self-contained vapor delivery system, comprising a nipple that is compatible with the system, including a vapor pipe with a first end and a second end, external screw threads at the first and second ends, an internal circumference and an external circumference, and an outward bevel from the internal to the external circumference at the first end, and that is compatible with the system, a delivery pressure test adapter means externally and piercingly mounted to the pipe between the first end and the second end to permit intermittent external measurement of vapor delivery pressure within the pipe, and vapor filter means fixedly mounted within the pipe at the first end to filter the vapor between the first and second end.

Another embodiment of the present invention is a vapor delivery pressure test adapter for self-contained vapor delivery systems, comprising a vapor supply source with a high delivery pressure and a vapor demand source with a low delivery pressure, a pressure regulator means to reduce the high delivery pressure to the low delivery pressure, a vapor pipe integrally connecting the pressure regulator means between the supply source and the demand source, and delivery pressure test adapter means externally and piercingly mounted to the pipe between the pressure regulator means and the demand source to permit intermittent external measurement of vapor delivery pressure within the pipe.

Another embodiment of the present invention is a vapor delivery pressure test adapter for installation at the outlet of a vapor delivery pressure regulator within a self-contained vapor delivery system, comprising a first nipple that is compatible with the system, including a first vapor pipe with a first end and a second end, and external screw threads at the first and second ends, a cap securely threaded upon the second end of the first vapor pipe, a tee fitting that is compatible with the system, including a second vapor pipe with a third end and a fourth end, with internal screw threads at the third and fourth ends, and with a lateral outlet with a fifth end, with internal screw threads at the fifth end, and the tee fitting securely threaded upon the first end of the first vapor pipe at the fifth end of the lateral outlet, a second nipple that is compatible with the system, including a third vapor pipe with a sixth end and a seventh end, and external screw threads at the sixth and seventh ends, an internal circumference and an external circumference, an outward bevel from the internal to the external circumference at the seventh end, and the nipple securely threaded into the fourth end of the tee fitting at the sixth end, vapor filter means internally and fixedly mounted within the third vapor pipe at the seventh end to filter the vapor between the sixth and seventh ends, and delivery pressure test adapter means externally and piercingly mounted to the second vapor pipe between the third end and the fourth end to permit intermittent external measurement of vapor delivery pressure within the second vapor pipe.

Another embodiment of the present invention is a vapor delivery pressure test adapter for installation at the outlet of a vapor delivery pressure regulator within a self-contained vapor delivery system, comprising, a first nipple that is compatible with the system, including a first vapor pipe with a first end and a second end, and external screw threads at the first and second ends, a cap securely threaded upon the second end of the first vapor pipe, a tee fitting that is compatible with the system, including a second vapor pipe with a third end and a fourth end, with internal screw threads at the third and fourth ends, and with a lateral outlet with a fifth end, with internal screw threads at the fifth end, securely threaded upon the first end of the first vapor pipe at the third end of the vapor pipe, a second nipple that is compatible with the system, including a third vapor pipe with a sixth end and a seventh end, and external screw threads at the sixth and seventh ends, securely threaded upon the tee fitting at the fifth end, vapor filter means internally and fixedly mounted within the third vapor pipe at the seventh end to filter the vapor between the sixth and seventh end, delivery pressure test adapter means externally and piercingly mounted to the second vapor pipe between the third end and the fourth end to permit intermittent external measurement of vapor delivery pressure within the second vapor pipe.

It is an object of the present invention to provide a vapor delivery pressure test adapter for installation at the outlets of vapor delivery pressure regulators within a self-contained vapor delivery system to permit intermittent external measurement of vapor delivery pressure without system disassembly or shut-down.

A further object of the present invention is to provide an inexpensive vapor delivery pressure test adapter that can be made available in kit form for original or retrofitted installation at the outlets of vapor delivery pressure regulators within a self-contained vapor delivery system to permit intermittent external measurement of vapor delivery pressure without system disassembly or shut-down.

A further object of the present invention is to provide a vapor delivery pressure test adapter for original or retro-fitted installation at the outlets of vapor delivery pressure regulators within a self-contained vapor delivery system to permit intermittent external measurement of vapor delivery pressure and which filters gas pipe scale flukes and oily by-products from such system.

A further object of the present invention is to provide a vapor delivery pressure test adapter for original or retro-fitted installation at the outlets of vapor delivery pressure regulators within a self-contained vapor delivery system to permit intermittent external measurement of vapor delivery pressure and which provides a sediment trap.

Related objects and advantages of the present invention will be apparent from the following descriptions.

DESCRIPTION OF THE PREFERRED EMBODIMENTS

Figure 1:
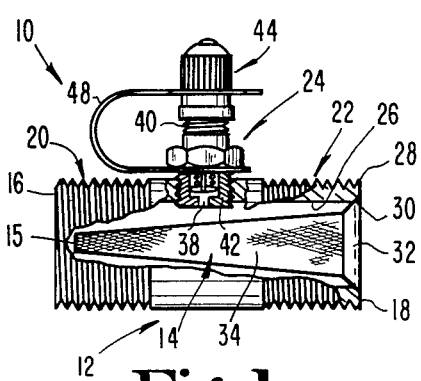
FIG. 1 is a partially segmented side view of the preferred embodiment of the vapor delivery pressure adapter of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the drawings, there is shown in FIG. 1 a preferred embodiment of the vapor delivery pressure test adapter 10 that is the present invention. This embodiment is composed of a vapor check valve 24 that is externally and piercingly mounted to a nipple 12, shown partially fragmented in FIG. 1 to reveal a flared cone filter 14 fixedly mounted within nipple 12.

Figure 6:
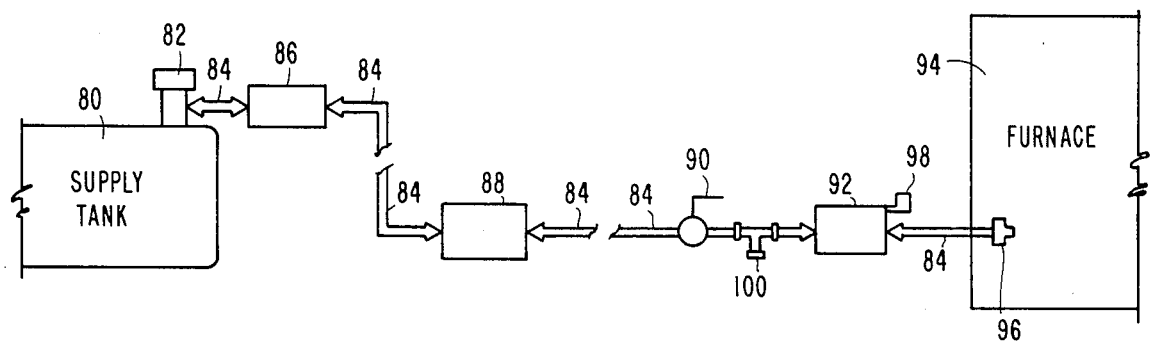
FIG. 6 is a diagramatic view of a self-contained vapor delivery system for a combustion furnace, and is a Prior Art drawing.

Nipple 12 is well known to the prior art; however, such a nipple is not known to include vapor check valve 24 or cone filter 14. Such nipples are typically constructed of extra heavy steel pipe that is compatible with the vapor pipe 84 of the prior art systems (FIG. 6). Such nipples are generally provided with a first pipe end 16, with external screw threads 20 at end 16, and a second pipe end 18 with external screw threads 22 at end 18, and include an internal circumference 26 and an external circumference 28. Such nipples are commonly used for a variety of purposes in the prior art, including making interconnections between sections of vapor piping 84 within a self-contained vapor delivery system such as that depicted in FIG. 6.

Figure 2:
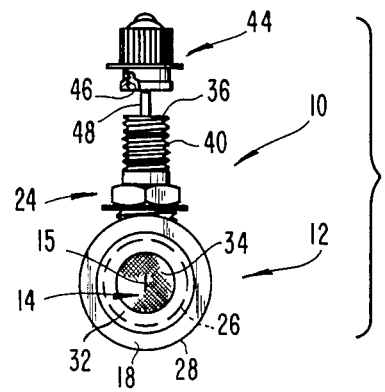
FIG. 2 is a partially exploded and partially segmented end view of the vapor delivery pressure adapter of FIG. 1.

Referring to FIGS. 1 and 2, nipple 12 of the preferred embodiment is modified to provide an outward bevel 30 from internal circumference 26 toward external circumference 28 at end 18. Outward bevel 30 matingly receives the flared ring 32 of a flared cone filter 14, such that the conically-shaped screen 34 of filter 14 is disposed into nipple 12 from end 18 toward end 16, with the vortex 15 of filter 14 disposed towards end 16 of nipple 12. In the preferred embodiment, flared ring 32 is secured in position at end 18 of nipple 12 by conventional soldering techniques.

Flared cone filter 14 is well known to the prior art. A flared cone filter of this general type is disclosed in U.S. Pat. No. 3,794,180, which is incorporated herein by reference. Flared cone filter 14 of the preferred embodiment is composed of a flared ring 32 manufactured from dead soft copper when the vapor to be filtered is propane gas, and from aluminum when the vapor to be filtered is natural gas. Conically-shaped screen 34 of the preferred embodiment is attached to flared ring 32 and screen 34 is manufactured from 100 mesh per square inch stainless steel screen. Stainless steel has been chosen to permit flared cone filter 14 to be cleaned with water-based solvents, and to inhibit rust oxidation while screen 34 is in use.

Nipple 12 of the preferred embodiment is further modified to receive vapor check valve 24. Check valve 24 is also well known in the prior art, and mechanically is of the general type utilized in the standard automobile tire valve stem. Check valve 24 of the present invention is of a calibre approved for utilization with vapor, such as propane gas or natural gas. Referring to FIGS. 1 and 2, check valve 24 of the preferred embodiment is composed of gas-vapor-compatible metal with a first valve end 36 and a second valve end 38. External screw threads 40 and 42 are provided at end 36 and end 38, respectively. Referring to FIG. 1, nipple 12 is piercingly tapped between end 16 and end 18 to matingly receive external screw threads 42 of check valve 24, which are coated with conventional gas pipe sealant and matingly threaded into nipple 12 until end 38 of check valve 24 is beyond internal circumference 26 of nipple 12.

Check valve 24 is further provided with a pressure seal cap 44 with internal screw threads 46 (FIG. 2) to permit pressure seal cap 44 to be removably threaded upon external screw threads 40 of check valve 24, thereby providing additional vapor sealing in the same manner as caps upon automobile tire check valves provide additional protection against unintended air loss. Such caps are therefore well known to the prior art. In the preferred embodiment, a strap 48 loosely interconnects check valve 24 and pressure seal cap 44 such that pressure seal cap 44 can be removably threaded to check valve 24 but will not be lost by inadvertent misplacement of pressure seal cap 44.

Referring to FIG. 6, vapor delivery pressure test adapter 10 is to be mounted within self-contained vapor delivery systems such as that diagramed in FIG. 6 by conventional vapor pipe construction methodology. In FIG. 6, vapor flows from left to right, or from the supply tank 80, being the high pressure supply source, to the burner orifice 96, being the demand source with low delivery pressure requirements. Thus, one test adaptor 10 is to be integrally interconnected in the vapor pipe 84 at the outlet of the high pressure regulator 86, between the high pressure regulator 86 and second stage regulator 88 in FIG. 6, and a second test adapter 10 is to be integrally interconnected in the vapor pipe 84 at the outlet of the second stage regulator, between the second stage regulator 88 and the burner orifice 96 in FIG. 6. When incorporating test adapter 10 into such system, test adapter 10 is oriented such that the apex 15 of conically-shaped screen 34 of filter 14 is disposed against the direction of vapor flow, which would be from the supply source with high delivery pressure to the demand source with low delivery pressure requirements, or from the left to the right in FIG. 6.

When integrally installed in prior art systems, as described above, test adapter 10 can be utilized to establish quickly and efficiently if the high pressure and second stage regulators, 86 and 88, respectively, are regulating vapor delivery pressure properly. Pressure seal cap 44 is threadingly removed from end 36 of check valve 24. A manometer, low pressure test gauge, or other appropriate vapor pressure gauge is then applied to end 36 of check valve 24, in the same manner as a typical tire pressure gauge is applied to the check valve within the valve stem of an automobile tire, thereby opening check valve 24 to permit instantaneous access to and measurement of the vapor delivery pressure within nipple 12 and thus within the vapor pipe 84 of such system. When the measuring gauge is removed from eighth end 36 of check valve 24, an internal spring within check valve 24 (not shown) biases check valve 24 closed, instantaneously resealing the system. The actual performance of pressure regulators 86 and 88 can thus be tested quickly, efficiently and intermittently by the system owner or service person. Adjustments can be quickly and precisely made to provide the required vapor delivery pressure reduction through each such regulator without system disassembly or shut-down. Complete system vapor delivery pressure testing can be accomplished without the time consuming and inefficient methods of the prior art, which required system shut-down and partial system disassembly to accomplish the same purpose, with less accurate and reliable end results.

Figure 3:
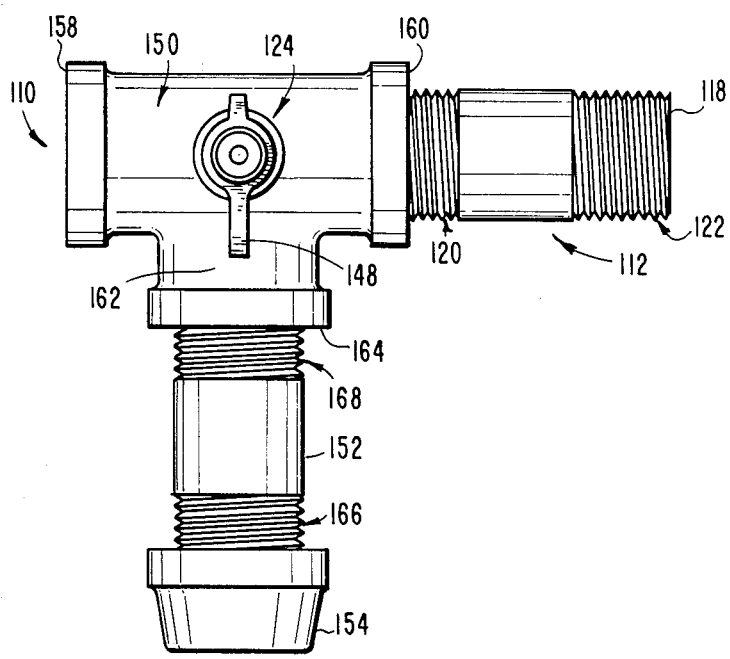
FIG. 3 is a side view of an alternate embodiment of the vapor delivery pressure adapter of the present invention.
Figure 5:
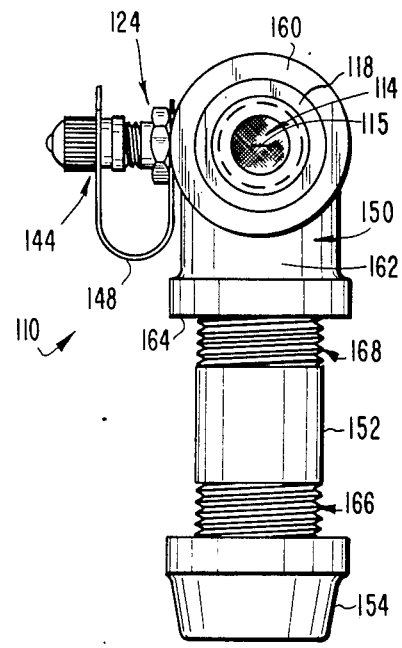
FIG. 5 is an end view of the vapor delivery pressure adapter of FIG. 3.
Figure 4:
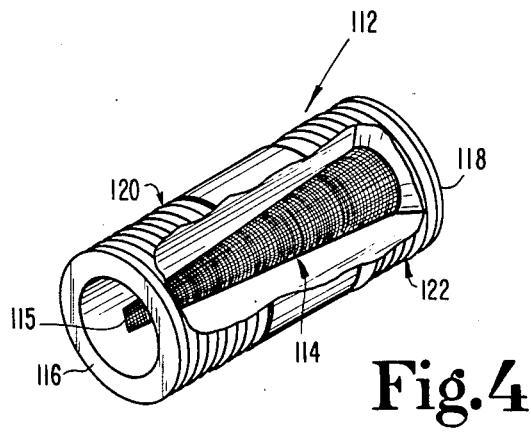
FIG. 4 is a perspective and partially segmented view of the second nipple of the vapor delivery pressure adapter of FIG. 3.

Referring now to FIGS. 3-5, there is shown another embodiment of the vapor delivery pressure test adapter 110 that is the present invention. This embodiment is composed of a vapor check valve 124 externally and piercingly mounted to a vapor pipe tee fitting 150, a downwardly extending first nipple 152 provided with a cap 154, and a laterally disposed second nipple 112.

Second nipple 112 has a sixth pipe end 116 and a seventh pipe end 118, with external screw threads 120 and 122 thereat, respectively. Second nipple 112 is otherwise identical in construction and configuration to nipple 12 described above (FIGS. 1 and 2), including the adaptation at end 118 of second nipple 112 of a flared cone filter 114 (FIG. 4) which is identical in construction, configuration, and methodology of attachment to nipple 112 to flared cone filter 14, and its attachment to nipple 12, as described above.

First nipple 152 is identical in basic construction to nipple 12 and second nipple 112, described above, with external screw threads 166 and 168 located at the second and first ends of first nipple 152 (not shown), respectively, but without the adaptation thereto of an outward bevel or a flared cone filter.

Cap 154 and tee fitting 150 are well known to the prior art, and are manufactured from heavy gauge steel piping material that is compatible with the vapor pipe 84 of the prior art systems (FIG. 6). Cap 154 is provided with internal screw threads (not shown) to threadingly receive the external screw threads 166 of first nipple 152 that are located at the second end thereof (not shown), such that a tight seal is provided when cap 154 is threadingly attached to the second end of first nipple 152 by conventional vapor pipe construction methodology.

Tee fitting 150 has a third pipe end 158, a fourth pipe end 160, and a lateral outlet 162 with a fifth outlet end 164. Tee fitting 150 is provided with internal screw threadings (not shown) at its ends 158, 160, and 164, respectively. Tee fitting 150 threadingly receives second and first nipples 112 and 152, respectively, into the internal screw threadings at fourth end 160 and end 164, respectively, of tee fitting 150. As shown in FIGS. 3 and 5, external screw threads 168 of first nipple 152 are threadingly received into end 164 of tee fitting 150, and end 116 of second nipple 112 (FIG. 4) is threadingly secured into end 160 of tee fitting 150, all in accordance with conventional vapor pipe construction methodology. Alternatively, first nipple 152 and second nipple 112 may be threadingly secured to tee fitting 150 at ends 158 and 164, respectively, to accommodate various piping arrangements encountered in the prior art vapor systems, first nipple 152 always being downwardly disposed, however.

Check valve 124 is identical in construction to check valve 24 discussed above, with a corresponding pressure seal cap 144 and strap 148, and spring-bias to close check valve 124. Check valve 124 is externally and piercingly mounted to tee fitting 150, which is tapped between end 160 and end 158 to matingly and threadingly receive check valve 124 by the identical methodology as check valve 24 is mounted to nipple 12, above.

Referring to FIG. 6, vapor delivery pressure test adapter 110 is mounted within self-contained vapor delivery systems, such as that diagramed in FIG. 6, by conventional vapor pipe construction methodology. The test adapter 110 is to be integrally incorporated within the vapor piping 84 on the outlet side of the second stage regulator 88 in the position shown in FIG. 6 for sediment trap 100. Test adapter 110 is oriented such that the vortex 115 of flared cone filter 114 within second nipple 112 is disposed against the direction of gas flow, as was the case for vortex 15 of test adapter 10, described above. Vapor delivery pressure test adapter 110 provides in downwardly extending first nipple 152 and cap 154 a sediment trap required by insurance industry code for self-contained vapor delivery systems, such as that diagramed in FIG. 6.

The methodology of the vapor pressure measuring operation of the test adapter 110 within the typical vapor delivery system is identical to that described for test adapter 10, described above.

In another embodiment of the present invention, a vapor check valve 24 (or 124) is externally and piercingly mounted directly to existing vapor piping 84 at the outlets of the high pressure regulator 86 and the second stage regulator 84 of FIG. 6. Mounting is accomplished utilizing the same methodology as that described above for mounting check valves 24 and 124 to nipples 12 and tee fitting 150, respectively. Vapor pipe 84 is tapped to threadingly receive check valve 24 (or 124) directly. Check valve 24, also with a spring-bias to close the valve, is then utilized in this embodiment in the manner described above for utilization of check valves 24 (or 124) in test adaptors 10 or 110 to determine vapor delivery pressure at the point of attachment of check valve 24 (or 124) to the vapor piping 84 of the prior art system (FIG. 6).

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A vapor delivery pressure test adapter for installation at the outlet of a vapor delivery pressure regulator within a self-contained vapor delivery apparatus, comprising:

a nipple that is sized to be integrally received within said apparatus, including a vapor pipe with a first pipe end and a second pipe end, and external screw threads at said first and second pipe ends; and delivery pressure test means externally and piercingly mounted to said pipe between said first pipe end and said second pipe end to permit external measurement of vapor delivery pressure within said pipe, said delivery pressure test means including a vapor check valve piercingly mounted to said pipe between said first pipe end and said second pipe end.

2. The vapor delivery pressure test adapter of claim 1 wherein:

said vapor check valve is spring-biased and includes a first valve end and a second valve end, external screw threads at said first and second valve ends, a pressure seal cap with internal screw threads removably threaded upon said first valve end, and said second valve end piercingly threaded to said pipe between said first and second pipe ends.

3. A vapor delivery pressure test adapter for installation at the outlet of a vapor delivery pressure regulator within a self-contained vapor delivery apparatus, comprising:

a nipple that is sized to be integrally received within said apparatus, including a vapor pipe with a first pipe end and a second pipe end, external screw threads at said first and second pipe ends, an internal circumference and an external circumference, and an outward bevel from said internal to said external circumference at said first pipe end:

delivery pressure test means externally and piercingly mounted to said pipe between said first pipe end and said second pipe end to permit external measurement of vapor delivery pressure within said pipe; and vapor filter means fixedly mounted within said pipe at said first pipe end to filter said vapor between said first and second pipe ends, said delivery pressure test means including a vapor check valve piercingly mounted to said pipe between said first pipe end and said second pipe end.

4. The vapor delivery pressure test adapter of claim 3 wherein:
said vapor check valve is spring-biased and includes a first valve end and a second valve end, external screw threads at said first and second valve ends, a pressure seal cap with internal screw threads removably threaded upon said first valve end, and said second valve end piercingly threaded to said pipe between said first and second pipe ends.

5. A vapor delivery pressure test adapter for installation at the outlet of a vapor delivery pressure regulator within a self-contained vapor delivery apparatus, comprising:
a nipple that is sized to be integrally received within said apparatus, including a vapor pipe with a first pipe end and a second pipe end, and external screw threads at said first and second pipe ends, said nipple having an outward bevel at said first pipe end; and
delivery pressure test means externally and piercingly mounted to said pipe between said first pipe end and said second pipe end to permit external measurement of vapor delivery pressure within said pipe; and,
said vapor filter means including a flared cone filter having a flared ring attached to a conically-shaped metal screen, said flared ring being fixedly and matingly seated upon said outward bevel, and said screen projecting into said pipe toward said second pipe end.

6. A vapor delivery pressure test adapter for self-contained vapor delivery apparatus, comprising:
a vapor supply source with a high delivery pressure and a vapor demand source with a low delivery pressure;
pressure regulator means to reduce said high delivery pressure to said low delivery pressure;
apparatus vapor pipe integrally connecting said pressure regulator means between said supply source and said demand source; and
delivery pressure test means externally and piercingly mounted to said apparatus vapor pipe between said pressure regulator means and said demand source to permit external measurement of vapor delivery pressure within said pipe, said delivery pressure test means including a vapor check valve piercingly mounted to said apparatus vapor pipe between said pressure regulator means and said demand source.

7. The vapor delivery pressure test adapter of claim 6 wherein:
said vapor check valve is spring-biased and includes first valve end and a second valve end, external screw threads at said first and second valve ends, a pressure seal cap with internal screw threads removably threaded upon said first valve end, and said second valve end piercingly threaded to said apparatus vapor pipe.

8. A vapor delivery pressure test adapter for self-contained vapor delivery apparatus, comprising:
a vapor supply source with a high delivery pressure and a vapor demand source with a low delivery pressure; pressure regulator means to reduce said high delivery pressure to said low delivery pressure;
apparatus vapor pipe integrally connecting said pressure regulator means between said supply source and said demand source; and
a nipple integrally interconnected with said apparatus vapor pipe between said pressure regulator means and said demand source, and including a vapor pipe with a first pipe end and a second pipe end, external screw threads at said first and second pipe ends, an internal circumference and an external circumference, and an outward bevel from said internal to said external circumference at said first pipe end; and
delivery pressure test means externally and piercingly mounted to said nipple between said first and said second pipe ends to permit external measurement of vapor delivery pressure within said apparatus vapor pipe, said delivery pressure test means including a vapor check valve piercingly mounted to said nipple between said first and said second pipe ends.

9. The vapor delivery pressure test adapter of claim 8 wherein:
said vapor check valve is spring-biased and includes a first valve end and a second valve end, external screw threads at said first and second valve ends, a pressure seal cap with internal screw threads removably threaded upon said first valve end, and said second valve end piercingly threaded to said nipple between said first and second valve ends.

10. A vapor delivery pressure test adapter for self-contained vapor delivery apparatus, comprising:
a vapor supply source with a high delivery pressure and a vapor demand source with a low delivery pressure;
pressure regulator means to reduce said high delivery pressure to said low delivery pressure;
apparatus vapor pipe integrally connecting said pressure regulator means between said supply source and said demand source; and
a nipple integrally interconnected with said apparatus vapor pipe between said pressure regulator means and said demand source, and including a vapor pipe with a first pipe end and a second pipe end, external screw threads at said first and second pipe ends, an internal circumference and an external circumference, and an outward bevel from said internal to said external circumference at said first pipe end;
delivery pressure test means externally and piercingly mounted to said nipple between said first and said second pipe ends to permit external measurement of vapor delivery pressure within said apparatus vapor pipe, said delivery pressure test means including a vapor check valve piercingly mounted to said nipple between said first and said second pipe ends; and
vapor filter means fixedly mounted within said nipple at said first pipe end to filter said vapor between said first and second pipe ends.

11. The vapor delivery pressure test adapter of claim 10 wherein:
said vapor check valve is spring-biased and includes a first valve end and a second valve end, external screw threads at said first and second ends, a pressure seal cap with internal screw threads removably threaded upon said first valve end, and said second valve end piercingly threaded to said pipe between said first and said second pipe ends.

12. The vapor delivery pressure test adapter of claim 10 wherein:
    said vapor filter means includes a flared cone filter having a flared ring attached to a conically-shaped metal screen, said flared ring being fixedly and matingly seated upon said outward bevel, and said screen projecting into said nipple toward said second pipe end.

13. A vapor delivery pressure test adapter for installation at the outlet of a vapor delivery pressure regulator within a self-contained vapor delivery apparatus, comprising:
    a first nipple that is sized to be integrally received within said apparatus, including a first vapor pipe with a first pipe end and a second pipe end, and external screw threads at said first and second pipe ends;
    a cap securely threaded upon said second pipe end of said first vapor pipe;
    a tee fitting that is sized to be integrally received within said apparatus, including a second vapor pipe with a third pipe end and a fourth pipe end, internal screw threads at said third and fourth pipe ends, a lateral outlet with a fifth outlet end, internal screw threads at said fifth outlet end, and said fifth outlet end securely threaded upon said first pipe end of said first vapor pipe;
    a second nipple that is sized to be integrally received within said apparatus, including a third vapor pipe with a sixth pipe end and a seventh pipe end, and external screw threads at said sixth and seventh pipe ends, an internal circumference and an external circumference, an outward bevel from said internal to said external circumference at said seventh pipe end, and said sixth pipe end threaded into said fourth pipe end of said tee fitting;
    vapor filter means internally and fixedly mounted within said third vapor pipe at said seventh pipe end to filter said vapor between said sixth and seventh pipe ends; and
    delivery pressure test means externally and piercingly mounted to said tee fitting between said third pipe end and said fourth pipe end to permit external measurement of vapor delivery pressure within said second vapor pipe.

14. The vapor delivery pressure test adapter of claim 13 wherein:
    said vapor filter means includes a flared coned filter having a flared ring attached to a conically-shaped metal screen, said flared ring being fixedly and matingly seated upon said outward bevel, and said screen projecting into said third pipe toward said sixth pipe end.

15. The vapor delivery pressure test adapter of claim 14 wherein:
    said vapor check valve is spring-biased and includes a first valve end and a second valve end, external screw threads at said first and second valve ends, a pressure seal cap with internal screw threads removably threaded upon said first valve end, and said second valve end piercingly threaded to said tee fitting between said third and fourth pipe ends.

16. The vapor delivery pressure test adapter of claim 14 wherein vapor filter means includes a flared coned filter having a flared ring attached to a conically-shaped metal screen, said flared ring being fixedly and matingly seated upon said outward bevel, and said screen projecting into said third vapor pipe toward said sixth pipe end.

17. The vapor delivery pressure test adapter of claim 13 wherein:
    said delivery pressure test means including a vapor check valve piercingly mounted to said tee fitting between said third pipe end and said fourth pipe end.

18. The vapor delivery pressure test adapter of claim 17 wherein:
    said vapor check valve is spring biased and includes a first valve end and a second valve, external screw threads at said first and second valve ends, a pressure seal cap with internal screw threads removably threaded upon said first valve end, and said second valve end piercingly threaded to said tee fitting between said third and fourth pipe ends.

19. A vapor delivery pressure test adapter for self-contained vapor delivery apparatus, comprising:
    a vapor supply source with a high delivery pressure and a vapor demand source with a low delivery pressure;
    pressure regulator means to reduce said high delivery pressure to said low delivery pressure;
    apparatus vapor pipe integrally connecting said pressure regulator means between said supply source and said demand source;
    a first nipple that is sized to be integrally received within said apparatus, including a first vapor pipe with a first pipe end and a second pipe end, and external screw threads at said first and second pipe ends;
    a cap securely threaded upon said second pipe end of said first vapor pipe;
    a tee fitting, including a second vapor pipe with a third pipe end and a fourth pipe end, internal screw threads at said third and fourth pipe ends, a lateral outlet with a fifth outlet end, internal screw threads at said fifth outlet end, said fifth outlet end securely threaded upon said first pipe end of said first vapor pipe, and said third pipe end integrally interconnected with said apparatus vapor pipe between said pressure regulator means and said demand source;
    a second nipple that is sized to be integrally received within said apparatus, including a third vapor pipe with a sixth pipe end and a seventh pipe end, and external screw threads at said sixth and seventh pipe ends, an internal circumference and an external circumference, an outward bevel from said internal to said external circumference at said seventh pipe end, and said sixth pipe end securely threaded into said fourth pipe end of said tee fitting, and said seventh pipe end integrally interconnected with said apparatus vapor pipe between said pressure regulator means and said demand source;
    vapor filter means internally and fixedly mounted within said third vapor pipe at said seventh pipe end to filter said vapor between said sixth and seventh pipe ends; and
    delivery pressure test means externally and piercingly mounted to said second vapor pipe between said third and fourth pipe ends to permit external measurement of vapor delivery pressure within said apparatus vapor pipe.

20. The vapor delivery pressure test adapter of claim 19 wherein:
    said delivery pressure test means includes a vapor check valve piercingly mounted to said second vapor pipe between said third and fourth pipe ends.

* * * * *